Dec. 28, 1954  H. T. LAMB  2,698,164
FOOD MIXING MACHINE
Filed Jan. 7, 1953  4 Sheets-Sheet 1

Dec. 28, 1954  H. T. LAMB  2,698,164
FOOD MIXING MACHINE
Filed Jan. 7, 1953  4 Sheets-Sheet 2

Inventor
Harold Thomas Lamb
By
Alexander Dowell
Attorneys

Dec. 28, 1954 H. T. LAMB 2,698,164
FOOD MIXING MACHINE
Filed Jan. 7, 1953 4 Sheets-Sheet 3

Inventor
Harold Thomas Lamb
By
Alexander & Dowell
Attorneys

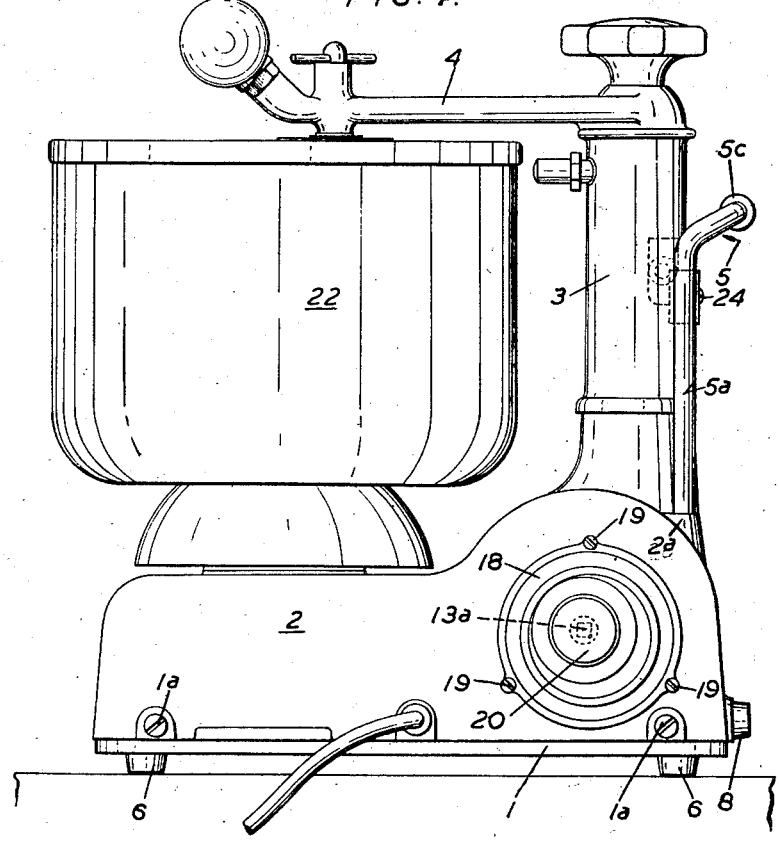

United States Patent Office 2,698,164
Patented Dec. 28, 1954

2,698,164

FOOD MIXING MACHINE

Harold Thomas Lamb, Benton, Newcastle upon Tyne, England

Application January 7, 1953, Serial No. 330,078

Claims priority, application Great Britain January 9, 1952

3 Claims. (Cl. 259—108)

This invention relates to food mixing machines of the kind comprising a housing, in which is a motor, which in turn drives a vertical shaft adapted to drive a mixing bowl with which co-operates a dolly or whisk.

Generally, the drive from the motor to the vertical shaft is through a reduction gear, as the speed of rotation of the bowl has to be relatively slow. However, some attachments, such as an emulsifier or liquidiser, require to be driven at relatively high speeds; and the object of the present invention is to provide means whereby such attachments may be driven direct from the motor shaft, while at the same time retaining the drive to the mixing shaft through reduction gearing.

According to the invention, the motor shaft is extended and the adjacent portion of the housing casing through which the motor axis passes, is cut away to allow for the introduction of means for coupling the required high speed attachment to the motor shaft extension, while supporting means are provided so that the machine may be swung through a right angle in the vertical axial plane of the motor, and made to rest firmly in a position in which the motor shaft is vertical.

The invention will now be described by way of example with reference to the accompanying drawings which show a mixing machine driving an emulsifier or liquidiser as it is sometimes called.

In the said drawings:

Fig. 4 is a side view of Fig. 3 showing the direct drive side of the machine.

Figure 1:
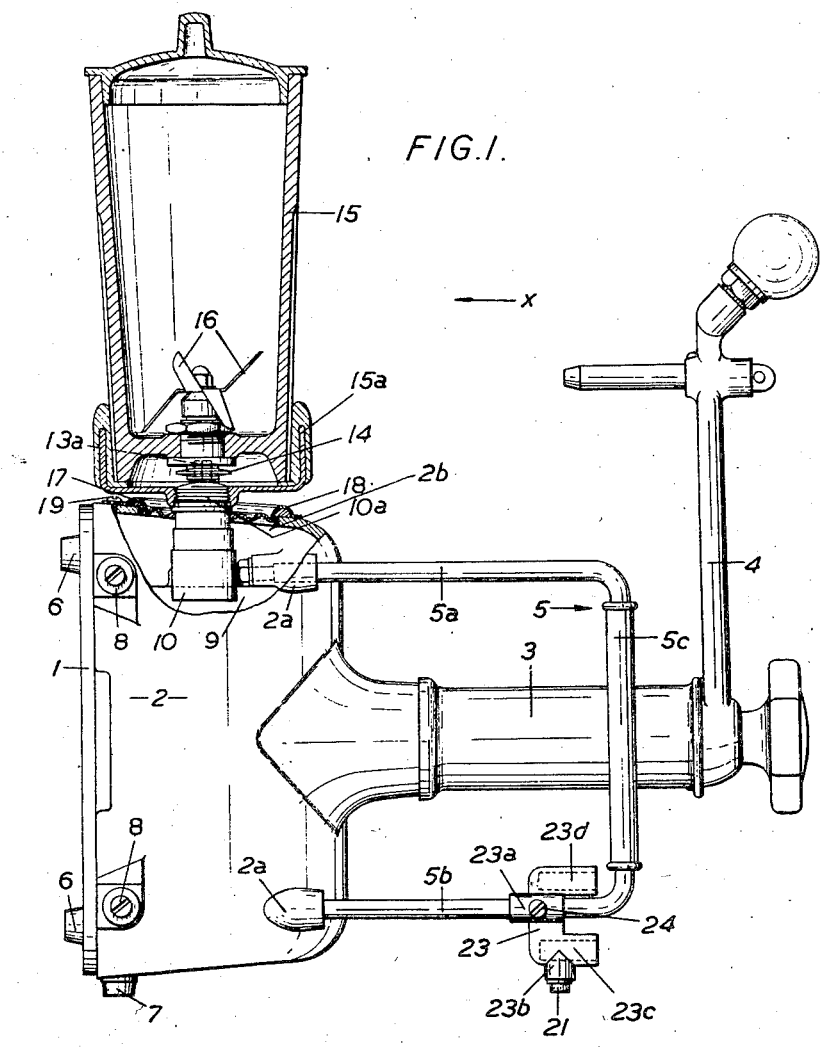
Fig. 1 is an elevation viewed from the rear of the machine which is in the position for emulsifying with the emulsifier fitted.
Figure 2:
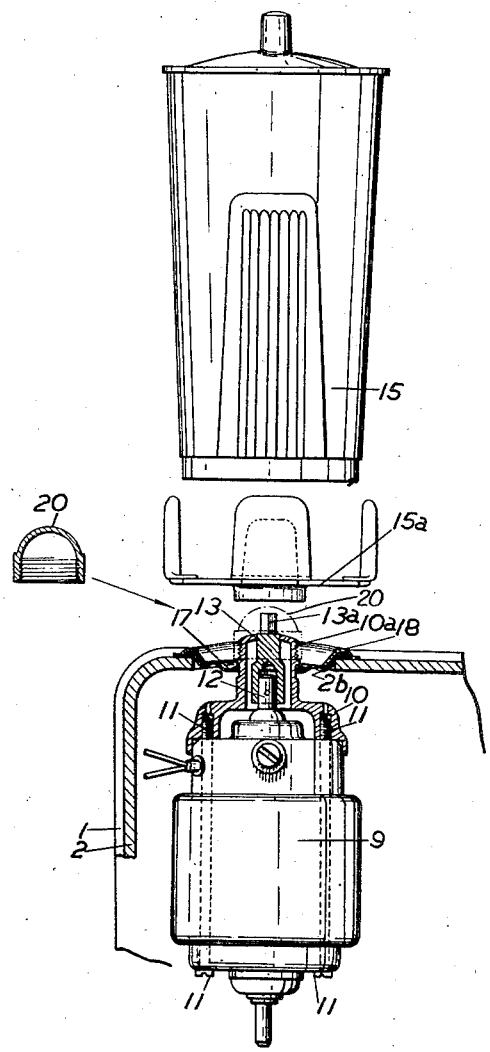
Fig. 2 is a partial sectional elevation of Fig. 1, looking in the direction of the arrow x, with the emulsifier parts exploded, and the cap shown separately.
Figure 3:
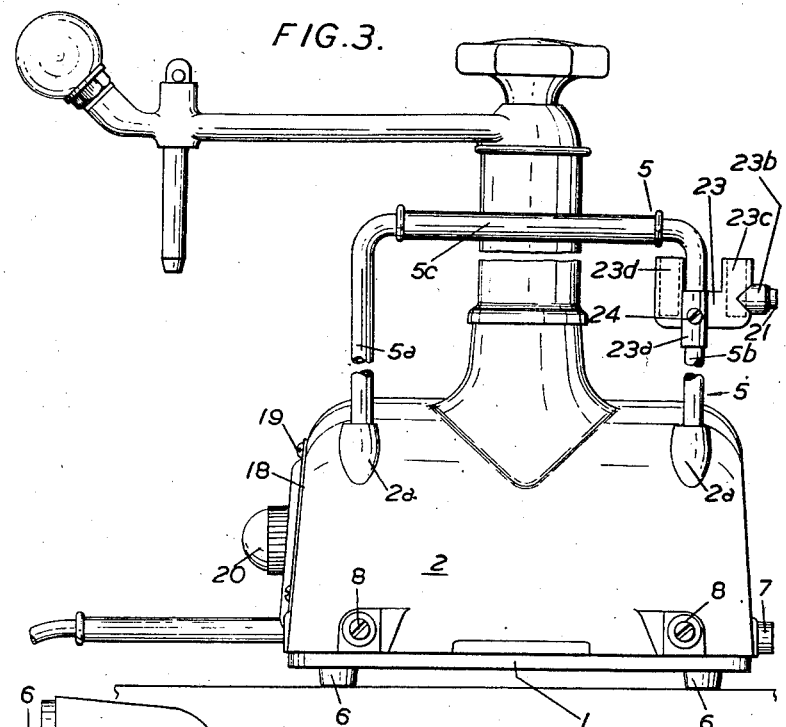
Fig. 3 is an outside elevation viewed from the rear showing the machine in the mixing position.
Figure 5:
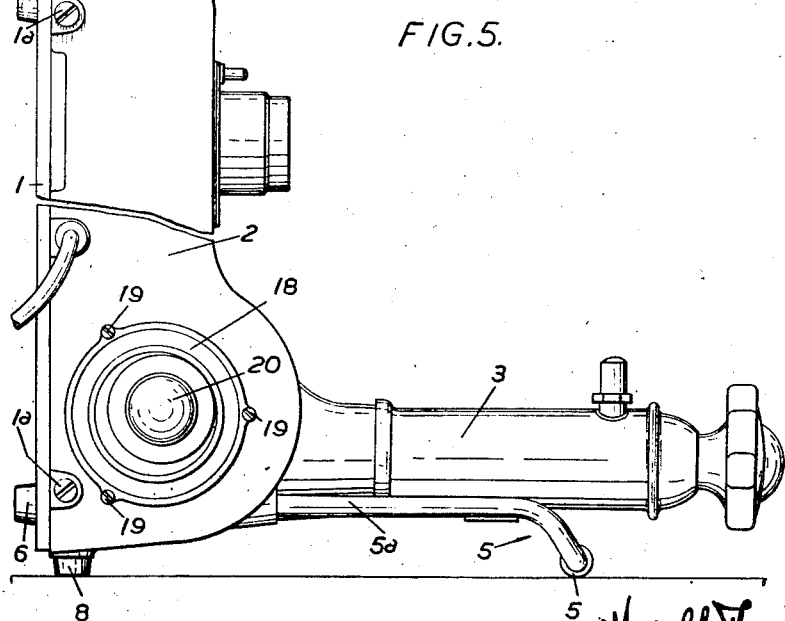
Fig. 5 is a similar view to Fig. 4 showing the machine in the mincing position.

Referring more particularly to Figs. 1 and 2, 1 is the base of the machine which carries the driving mechanism, and to which is secured by screws 1a a cover casing 2 from which extends a pillar 3. On the pillar 3 is mounted a swinging arm 4 for mixing; while 5 is a handle and support of U-shape, of the kind described in my co-pending U. S. patent application No. 256,446 whose arms 5a, 5b are fitted into bored bosses 2a of the casing 2 so that it extends from the latter parallel with the pillar 3. 6 are four rubber feet secured to the underside of the base 1; 7 are two rubber feet secured to the lower edge of the side of the casing 2 which is remote from the opening 2b; and 8 are two further rubber feet secured to the lower edge of the rear side of the casing 2. The feet 8 with a rubber sleeve 5c on the handle and support 5 provide the supports for the machine in the mincing position shown in Fig. 5.

Mounted on the base plate 1 is the driving motor 9. A mounting bridge 10 is attached to the end of the motor 9 by means of the two existing bolts 11 (Fig. 2) which secure the ends of the motor and form a complete unit. Concentric with the motor axis and integral with the mounting bridge is an externally screw threaded holding member or portion 10a which projects through a circular opening 2b in the cover casing 2. 12 is the motor shaft, having mounted on it a stub shaft 13 which passes through a central opening in the holding portion 10a, and has at its extremity a square section 13a to take a corresponding socket portion of an adaptor 14 (Fig. 1) which is extended to drive the blades 16 of an emulsifier or liquidiser 15.

In order to prevent the ingress of water or other liquid matter, the space between the holding portion 10a and the circular opening 2b in the cover casing 2 is sealed off by means of a flexible rubber diaphragm 17 which at its inner portion is resiliently mounted over the holding portion 10a, and at its periphery is held in position on the casing 2 by means of a ring 18 attached to the cover casing 2 by screws 19. The flexibility of the rubber diaphragm 17 allows for the free movement of the motor when under full load.

When the emulsifier 15 is not in use, the square end 13a of the driving stub shaft 13 is protected by a dome nut or cap 20, which is screwed to the holding portion 10a.

21 is the third foot which co-operates with the feet 7 for supporting the machine when emulsifying is to be effected, as in Fig. 1, and is combined with a socket for supporting a scraper arm, (not shown) which co-operates with the mixing bowl 22 (Fig. 4) for mixing operations. This combination takes the form of a bracket 23 comprising at one end a transverse boss 23a bored so as to be a sliding fit on the arm or pillar 5b of the handle and support 5, a set bolt or pin 24, being provided for maintaining it in the correct position. At the outer end of the bracket 23 is a longitudinal boss 23b bored to receive the rubber stud which constitutes the foot 21. Between the bosses 23a and 23b is another transverse boss 23c which is joined to the other bosses by webs; and on the side of the boss 23a remote from the boss 23c is a second boss 23d similar to the boss 23c, the bosses 23c and 23d being bored for most of their length to receive the scraper arm, which is thus able to be used in two different positions. The length of the bracket 23 is such that the outer ends of the studs of the three feet 6, 7 lie in a vertical plane when the machine is in the normal mixing position, so that the driving shaft is vertical when the machine is in the emulsifying position of Fig. 1.

In use, the machine is turned through a right angle so that the motor shaft moves from the horizontal into the vertical as shown in Fig. 1. The cap 20 is removed from the holding member 10, the emulsifier platform 15a screwed on to the latter, and the emulsifier or liquidiser applied.

I claim:

1. A food mixing machine of the kind referred to, comprising a motor shaft normally disposed in a horizontal position, and a housing cover casing, a stub extension of said motor shaft, the portion of said housing cover casing adjacent said stub extension and through which the motor axis passes being cut away, a high speed emulsifier attachment having a stationary portion, and a rotatable member, means on the extension for coupling the high speed emulsifier attachment to the motor shaft, supporting means rigid with said casing for allowing the machine to be swung through a right angle in the vertical axial plane of the motor shaft, and made to rest firmly in a position in which the motor shaft is vertical, a mounting bridge attached to the end of the motor, a holding member concentric with the motor axis and rigid with said mounting bridge, said holding member having an axial opening and projecting through the cut away portion in the cover casing, said holding member being adapted to receive the stationary portion of the emulsifier attachment, while the motor shaft is adapted to be engaged in driving relation with the rotatable member of the attachment, through said axial opening in the holding member.

2. In a machine as set forth in claim 1, a ring member on the motor housing casing, and a flexible diaphragm whose periphery fits over said ring member on the motor housing casing, and is thereby secured to the opening in the casing.

3. A food mixing machine of the kind referred to, comprising a motor shaft normally disposed in a horizontal position, and a housing cover casing, a stub extension of said motor shaft, the portion of said housing cover casing adjacent said stub extension and through which the motor axis passes being cut away, a high speed emulsifier attachment having a stationary portion, and a rotatable member, means on the extension for coupling the high speed emulsifier attachment to the motor shaft, supporting means whereby the machine may be swung through a right angle in the vertical axial plane of the motor shaft, and made to rest firmly in a position in which the motor shaft is vertical, a pillar extending normal from the top of the casing, means for supporting the machine in either of the two above mentioned positions comprising feet secured along the lower edge of the housing cover casing remote from the opening, additional feet on said casing at right angles to the first mentioned feet, a U-shaped handle which extends from the housing cover casing parallel with said pillar, a bracket on one of the arms of said handle, and a foot mounted on said bracket.

References Cited in the file of this patent

UNITED STATES PATENTS

| Number | Name | Date |
|---|---|---|
| 1,489,242 | Gilchrist | Apr. 8, 1924 |
| 1,607,811 | Blum | Nov. 23, 1926 |
| 1,927,184 | Poplawski | Sept. 19, 1933 |
| 2,278,125 | Landgraf | Mar. 31, 1942 |
| 2,594,936 | Lamb | Apr. 29, 1952 |